United States Patent [19]

Warden et al.

[11] Patent Number: 5,341,555
[45] Date of Patent: Aug. 30, 1994

[54] METHOD OF PREPARING FILM ADHESIVE THERMAL FOIL

[75] Inventors: Laurence Warden; Keith Esser, both of San Diego, Calif.

[73] Assignee: Biomagnetic Technologies, Inc., San Diego, Calif.

[21] Appl. No.: 922,678

[22] Filed: Jul. 30, 1992

[51] Int. Cl.⁵ .............................................. B21D 35/00
[52] U.S. Cl. ................................... 29/469.5; 29/527.1; 29/527.3; 29/890.03; 156/171; 156/173
[58] Field of Search ................. 29/469.5, 527.1, 527.2, 29/527.3, 527.4, 618, 831, 856–859, 825, 890.03; 156/171, 172, 173, 307.7

[56] References Cited

U.S. PATENT DOCUMENTS

| | | | |
|---|---|---|---|
| 1,697,142 | 1/1929 | Roller | 156/307.7 X |
| 2,389,733 | 11/1945 | Lee | 156/171 X |
| 2,870,277 | 1/1959 | Carter | 29/618 X |
| 3,502,527 | 3/1970 | Borden | 156/171 X |
| 3,660,199 | 5/1972 | Riccitiello et al. | 156/307.7 X |
| 4,180,608 | 12/1979 | Del | 156/307.7 X |
| 4,384,401 | 5/1983 | Borrup | 29/618 X |
| 4,783,365 | 11/1988 | Skalarski et al. | 156/307.7 |
| 5,100,490 | 3/1992 | Holroyd et al. | 156/171 X |

FOREIGN PATENT DOCUMENTS 11993 of 1913 United Kingdom .................. 29/618

*Primary Examiner*—Mark Rosenbaum
*Assistant Examiner*—S. Thomas Hughes
*Attorney, Agent, or Firm*—Gregory Garmong

[57] ABSTRACT

A thermal foil material is made of a layer of B-staged curable epoxy film adhesive and a plurality of substantially parallel insulated copper wires embedded in the epoxy layer. The copper wires are arranged in a side-by-side fashion in at least one layer within the epoxy. Such a thermal foil material is prepared by furnishing a first sheet of a B-staged film adhesive material, preferably wrapped over a mandrel, and placing a layer of metallic elements onto the first sheet with the metallic elements arranged in a side-by-side fashion. A second sheet of a B-staged film adhesive material is placed over the layer of metallic elements and the first sheet. The stack is heated and pressure is applied perpendicular to the first and second sheets to cause the B-staged film adhesive mate rial to flow into the interstices between the metallic elements. This material may be used immediately or stored to prevent further curing of the epoxy until it is used.

9 Claims, 3 Drawing Sheets

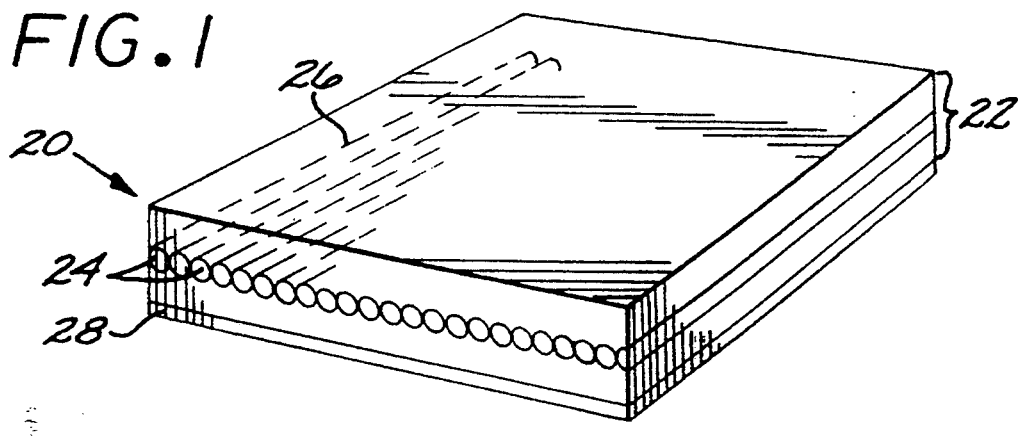
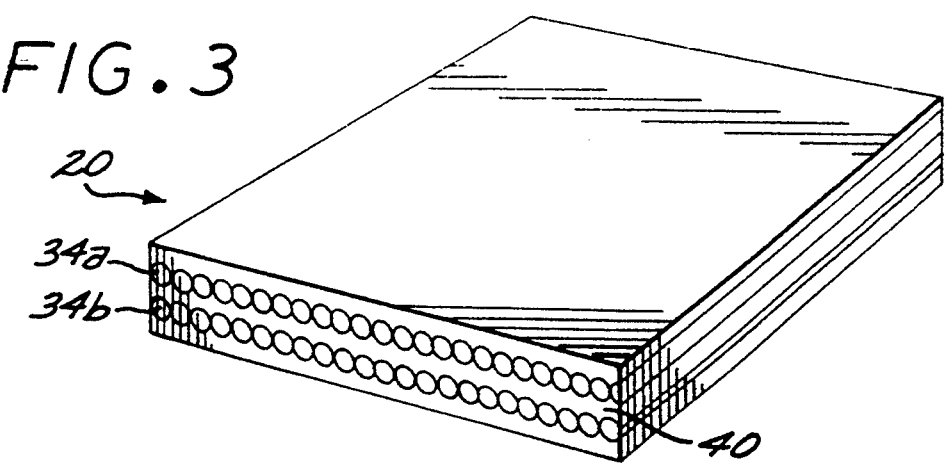
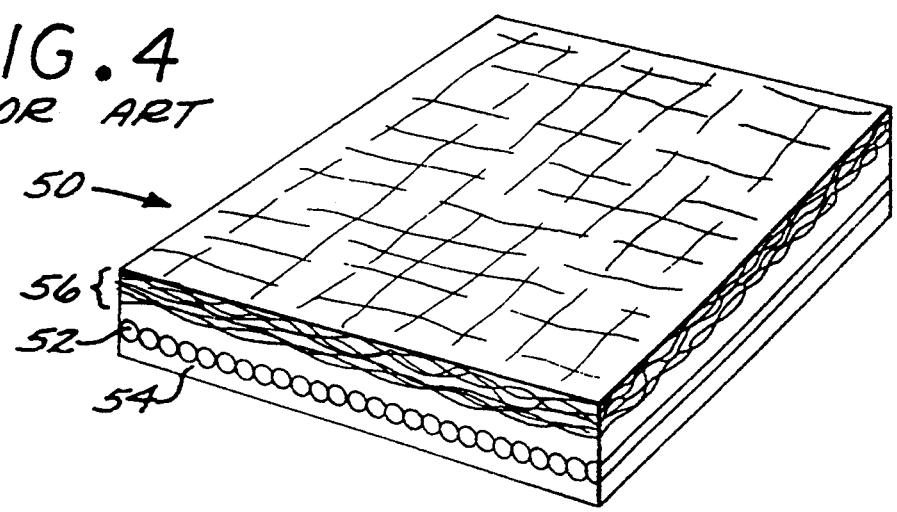

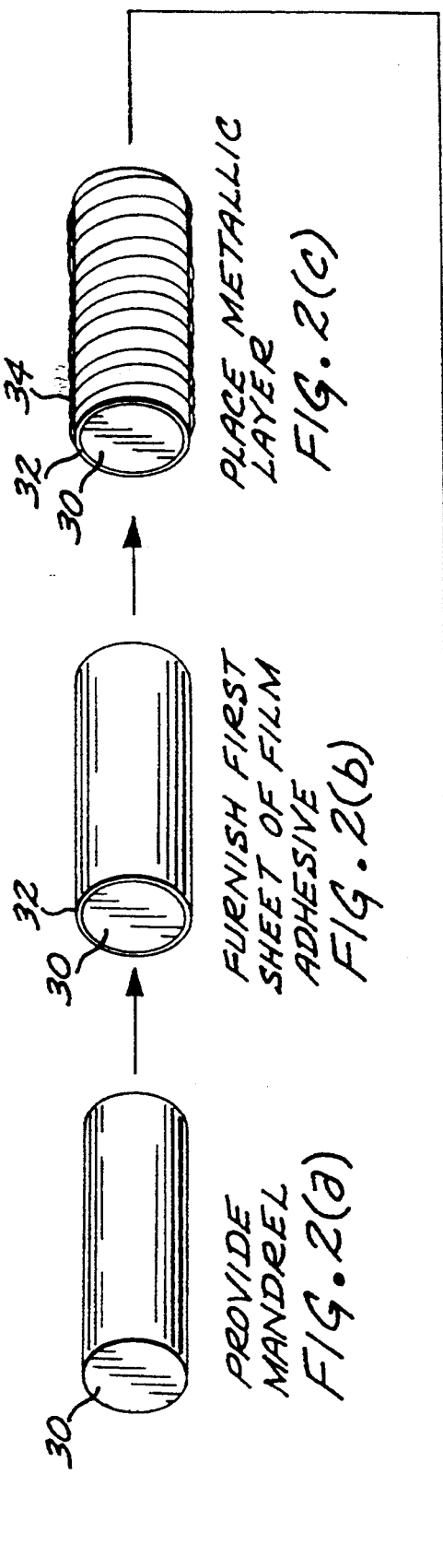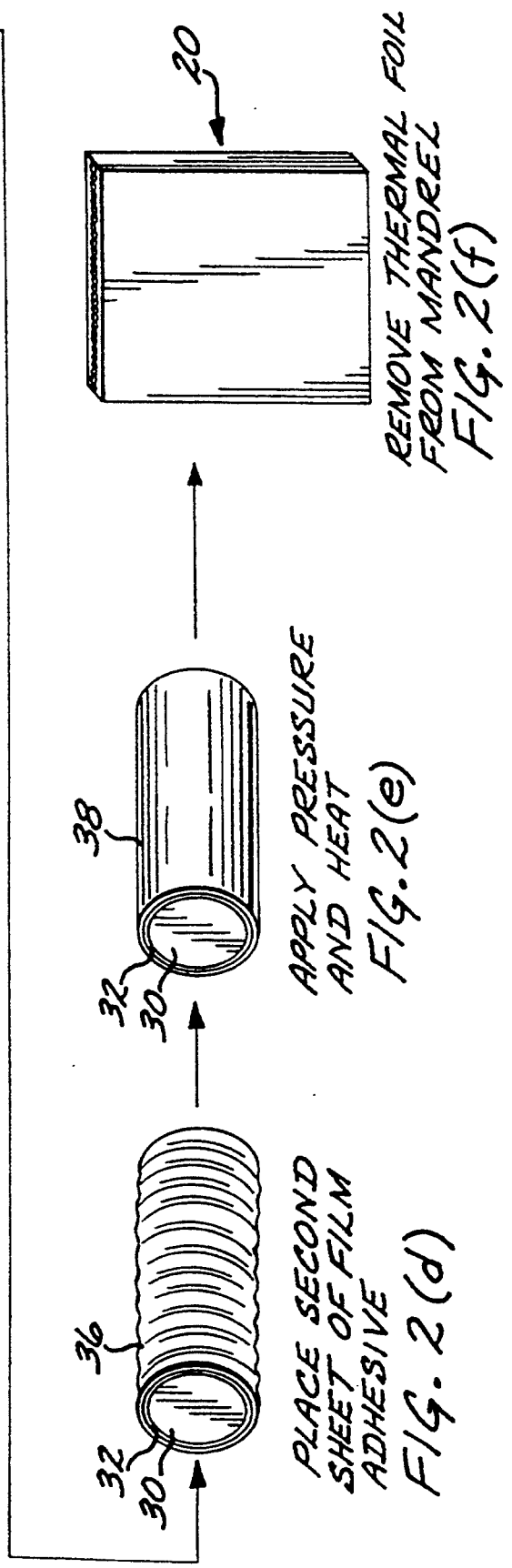

METHOD OF PREPARING FILM ADHESIVE THERMAL FOIL

BACKGROUND OF THE INVENTION

The invention relates to a specialized thermal conductive material of a layer of wires embedded in an insulator, and, more particularly, to such a material that is readily used in fabrication of structures and a method for its preparation.

Biomagnetometers are devices that measure the small magnetic fields produced by a living organism. The biomagnetometer includes a number of sensors arranged in an array external to the organism, which measure the magnetic field at a number of locations. Each sensor has a magnetic field pickup coil that may be a magnetometer or a gradiometer. When a small magnetic flux change penetrates the pickup coil, a small electrical current flows in the coil. This small current is detected by a sensitive detector of electrical currents, preferably a Superconducting QUantum Interference Device, known by the acronym "SQUID". The output of the various SQUIDs, after signal conditioning and filtering, is provided to a computer which stores and analyzes the data.

The SQUIDs operate only at superconducting temperatures, and to attain the best system performance the pickup coils and SQUIDs are usually placed into a cryogenically cooled vessel termed a dewar. The dewar contains a reservoir of a cryogenic fluid such as liquid helium, with the sensors and SQUIDs in a structure termed a "dewar tail" that extends downwardly from the reservoir. A thermal shield surrounds the dewar and is supported from the neck at the upper end of the dewar. The thermal shield aids in maintaining the low temperature of the sensors and SQUIDs by intercepting radiant heat that flows inwardly through an outer dewar body and outer insulation. The heat received by the thermal shield is conducted upwardly through the thermal shield to the point of its attachment at the dewar neck, where the heat is transferred to the cryogenic gas that evaporates from the reservoir. The entire structure must be nonmagnetic in order to avoid interfering with the operation of the pickup coils and SQUIDs.

It has been conventional practice to fabricate the thermal shield in part from a hybrid material termed "coil foil". Coil foil is formed as cured glass reinforced epoxy panels with unidirectional copper wires embedded in epoxy supported on a fiberglass panel. In the dewar construction, the coil foil is oriented with the copper wires leading upwardly from the dewar tail, past the cryogenic reservoir, and to the neck, so that heat received by the thermal shield can flow along the wires to be removed from the system in the vaporized cryogenic gas. A metallic sheet heat conductor is not used because eddy currents could flow in the conductor and interfere with the operation of the sensors.

In many instances the existing coil foil has not been satisfactory as a material of construction. Its board-like character prevents fabrication of the intricate forms required for small and complexly shaped sensor configurations. The attempted solution has been to bend the coil foil to shape, slitting it where necessary, which often results in creases and small cracks in the coil foil. The fabrication of the dewar is therefore more expensive and difficult, and in many instances has not been successful. Even where the dewar can be constructed by this approach, it is more bulky than desired.

There is a need for an improved approach for conducting heat from cooled elements to thermal reservoirs or thermal sinks, while not being susceptible to production of eddy currents. The present invention fulfills this need, and further provides related advantages.

SUMMARY OF THE INVENTION

The present invention provides a construction material, and a method for its preparation, which is an effective single-direction heat conductor. It does not sustain eddy-current loops, and therefore can be used in low-magnetic-field applications. The material has been shown to be useful in fabricating dewars having complexly shaped and and small-size components. The material is no more expensive to prepare than conventional coil foil, and is less expensive to use.

In accordance with the invention, a thermal foil material comprises a layer of B-staged curable adhesive, and a plurality of elongated thermally conductive elements embedded in the adhesive layer. The curable adhesive is preferably a film adhesive such as epoxy. The thermally conductive elements desirably have a thermal conductivity of at least 130 BTU/hour/square foot/degree F/foot, and are preferably metallic. The metallic elements are preferably copper wires with an electrical insulation coating, arranged in a side-by-side fashion to form at least one layer. There may be multiple layers of both the curable adhesive and the metallic elements.

The invention also provides a method for making such a material. A method of preparing a thermal foil material comprises the steps of furnishing a first sheet of a B-staged film adhesive material, placing a layer of metallic elements onto the first sheet, the metallic elements being arranged in a side-by-side fashion, and placing a second sheet of a B-staged film adhesive material over the layer of metallic elements and the first sheet. A pressure is applied perpendicular to the first and second sheets, preferably while the stack of sheets and metallic elements are heated, to cause the B-staged film adhesive material to flow into the interstices between the metallic elements.

A key to the present invention is forming the thermal foil material using a B-staged curable adhesive material such as a B-staged epoxy. When epoxies are cured, they pass through various degrees of curing, from uncured to cured, and then to post-cured to achieve the greatest strength. In the present approach, the thermal foil material is prepared using a partially cured film adhesive material, termed a "B-staged" epoxy. The thermal foil material is prepared by sandwiching one or more layers of metallic elements such as parallel wires between layers of the B-staged adhesive, and partially consolidated to fill the interstices between the metallic elements with B-staged adhesive material.

The resulting material is as flexible as a sheet of paper, and can be cut like paper parallel to the metallic elements to form strips. The strips are laid up to form the heat conductor elements. Due to the flexibility of the thermal foil material, intricate and small-scale shapes are readily formed.

The thermal foil material must be used immediately or stored at low temperature to prevent further curing in the event that it is to be used later. If further curing occurs, the material becomes hard and board-like, and suffers from the same problems as conventional coil foil.

The present invention is an advance in the art of heat conductor materials. It provides a material that is an excellent unidirectional heat conductor, is electromagnetically transparent, and can be readily fabricated into shapes. Other features and advantages of the invention will be apparent from the following more detailed description of the preferred embodiments, taken in conjunction with the accompanying drawings, which illustrate, by way of example, the principles of the invention.

BRIEF DESCRIPTION OF THE DRAWINGS

FIG. 1 is a perspective view of a thermal foil material of the invention;

FIGS. 2(a)-2(f) are pictorial flow chart for the preferred method of preparation of the thermal foil material;

FIG. 3 is a perspective view of another embodiment of the thermal foil;

FIG. 4 is a perspective view of a prior coil foil material;

DETAILED DESCRIPTION OF THE PREFERRED EMBODIMENTS

Figure 5:
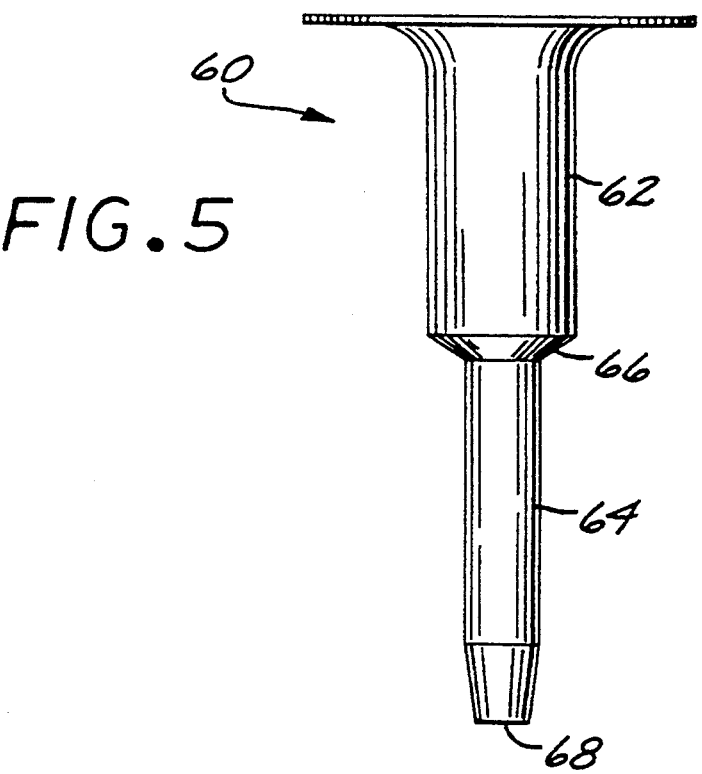
FIG. 5 is an elevational view of a heat shield made with the thermal foil material of the invention.

FIG. 1 depicts a preferred thermal foil material 20 according to the present invention. The thermal foil material 20 includes a layer 22 of a B-staged curable film adhesive. The film adhesive is preferable an epoxy, such as Newport NB101. The film adhesive is provided in an intermediately cured or B-staged state with a plastic backing in place. The film adhesive is received in a frozen state to prevent further curing, and is allowed to warm to ambient temperature prior to use. The B-staged epoxy material is sufficiently partially cured to be handled as a sheet on its backing, and is very pliable.

Embedded in the adhesive layer 22 is a plurality of thermally conductive metallic elements, such as metallic elements, in this preferred case a plurality of metallic wires 24. The wires 24 are preferably coated with a thin coating 26 of an insulation such as enamel. (The adhesive may also be an insulator, but the coating 26 is an insulator in addition to the adhesive that may be present.) The wires 24 are arranged in a side-by-side fashion in a layer, with the wires 24 extending parallel to each other. The wires 24 are preferably made of copper, aluminum, silver, gold, or an alloy thereof. (As used in some places herein, the term "copper" includes pure copper and its alloys, the term "aluminum" includes pure aluminum and its alloys, the term "silver" includes pure silver and its alloys, and the term "gold" includes pure gold and its alloys.) These materials are good thermal conductors.

The adhesive material of the layer 22 penetrates around the wires 24, filling all spaces and interstices between the wires.

A release layer 28 may also be optionally provided on one or both sides of the thermal foil material 20. The release layer 28 is preferably plastic or wax-coated paper, and is provided to make it easier to handle the B-staged adhesive material during its subsequent use.

In a preferred embodiment as shown in FIG. 1, the total thickness of the layer 22 is about 0.010 inches and the diameter of each of the wires 24 is about 0.003 inches. These dimensions are provided by way of example, and should not be interpreted as limiting of the invention. They provide a preferred ratio of wire to film adhesive in the final product, but that ratio may be varied as desired by varying the relative dimensions.

FIGS. 2(a)-2(f) depict the preferred process for preparing the thermal foil material 20 of FIG. 1, in the form of a pictorial flow chart that shows the resulting structure for each step. The thermal foil material is prepared on a cylindrical mandrel 30, as shown in FIG. 2(a). The excellent pliability of the finished thermal foil material 20 permits its fabrication around a cylindrical mandrel, even though it is to be straightened into a flat form prior to use. The mandrel 30 is supported on a rotating support (not shown), in the manner of a lathe.

A first sheet 32 of a B-staged film adhesive material is wrapped onto the mandrel and held in place by any appropriate means, such as tape, FIG. 2(b).

A length of insulation-coated wire 24 is wrapped around the mandrel 30 that has been covered with the first sheet 32, FIG. 2(c). The wire 24 is wrapped in a spiral pattern to form a wire layer 34 with each turn of wire closely adjacent the prior turn. The pitch of each turn is so small, about 0.003 inches in the preferred case, that the wires of each turn will be substantially, although not perfectly, parallel to each other in the final thermal foil material 20. The use of a cylindrical mandrel permits this placement of the wire to be readily and economically accomplished. Layup of the wire in a flat form is also possible, but more time consuming than the winding approach discussed here.

After the wire layer 34 is wrapped onto the mandrel covered with the first sheet of film adhesive material, a second sheet 36 of B-staged film adhesive material is wrapped over the wire layer 34, FIG. 2(d). The film adhesive material of the second sheet 36 may be the same composition as the first sheet 32, or a different composition. The second sheet 36 may be the same thickness as the first sheet 32, or a different thickness. In the preferred case, the second sheet 36 is of the same composition and thickness as the first sheet In this as-wrapped form, there are typically interstices (i.e., voids or spaces) between the wires 24 of the wire layer 34. These interstices are filled by applying radially inward pressure onto the exterior surface of the second sheet 36, with the assembly heated slightly, FIG. 2(e). A sufficient external pressure is applied by wrapping the assembly of FIG. 2(d) with a strip 38 of polyester shrink film in tension. Such shrink film is available strips 0.002 inches thick and 2 inches wide. The outside of the shrink film 38 is then gently heated to about 110° F. to cause the shrink film to shrink and apply pressure, and to heat the film adhesive of the first sheet 32 and second sheet 35 so that it flows into the interstices. Care is taken not to heat the first sheet 32 and second sheet 36 to any substantially higher temperatures and not to apply the heat for too long a time, as in these cases the film adhesive may cure substantially past the B-staged cure level. The objective of the step shown in FIG. 2(e) is consolidation of the material, not curing.

After consolidation is complete, the shrink film strip 38 is removed. The thermal foil material 20 is removed from the mandrel 30 and pressed flat. In the preferred embodiment discussed herein where the layer 22 is about 0.010 inch thick and the wires 24 are about 0.003 inch diameter copper, the thermal foil material 20 is as pliable as a sheet of paper, and may be easily unwound from the mandrel 30 and pressed flat. The thermal foil material 20 may be used in the width provided, or slit lengthwise along the wires to form strips. The thermal foil material 20 may also be cut perpendicular to the wires 24, but more care must be taken to avoid distortion.

Another embodiment of the thermal foil material 20 is shown in FIG. 3. In this case, there are two layers of wire 34a and 34b. An intermediate sheet 40 of film adhesive material may be placed between the two layers 34a and 34b. Equivalent thermal foil materials with additional layers of wire can be provided in the same manner with further intermediate sheets of film adhesive material. If up to about three layers of wire are to be used, it is preferred that no intermediate layers 40 of film adhesive material be used. If more than three layers of wire 34 are to be used, it is preferred to add intermediate layers 40 between the respective layers of wire.

The structure of the thermal foil material 20 of the invention may be contrasted with that of the prior coil foil material 50, shown in FIG. 4. In this material 50, copper wires 52 are embedded in a layer of epoxy 54. The copper wire/epoxy material is supported on a board-like layer 56 of fiberglass. Because it is fully cured rather than retained in the B-staged condition as in the present approach, the coil foil material 50 is hard and cannot be readily formed into intricate shapes, such as required for some elements of dewar and dewar-tail construction.

Once the thermal foil material 20 has been prepared in the manner described, it retains its pliability for about 96 hours at a temperature of 65° F. This time depends upon the type of film adhesive and the temperature. During this period the film adhesive continues to cure slowly, and eventually becomes too stiff to be readily usable for most device construction techniques. To retard curing of the film adhesive, the thermal foil material 20 may be cooled to a reduced temperature, as by packing it in dry ice or placing it in a freezer. Such cooled materials may be stored for extended periods of time before use.

When the material is used, it is laid up onto forms of the proper shape and size. Layers of construction material such as fiberglass may also be placed onto the form for strength in some structures. The entire form, the construction material, and the thermal foil material 20 are heated to elevated temperature to cure and post-cure the film adhesive material. In a typical case for the preferred film adhesive epoxy Newport NB101, curing and post-curing are completed at a temperature of 250° F. and for a time of 2 hours.

An example will aid in understanding the advantages afforded by the present thermal foil material as compared with a conventional coil foil material. In one instance, it is desired to fabricate a heat shield 60 as shown in FIG. 5. The heat shield 60 is generally cylindrical, with two regions 62 and 64. Copper conducting wires must extend parallel to the cylindrical axis in the wall of the heat shield 60. The upper region 62 has a diameter of about 1½ inches, and the lower region 64 has a diameter of about ¾ inch. There is a sharp edge with no radius in the transition region 66, and a flat bottom 68. A first attempt was made to fabricate the heat shield 60 from the conventional coil foil 50 of FIG. 4, which was unsuccessful because the coil foil 60 could not be bent to small radii without cracking. A further attempt to make the heat shield 50 from the thermal foil material 20 of FIG. 1 was successful. Thus, the thermal foil material of the invention permits parts to be built that cannot otherwise be fabricated.

Figure 6:
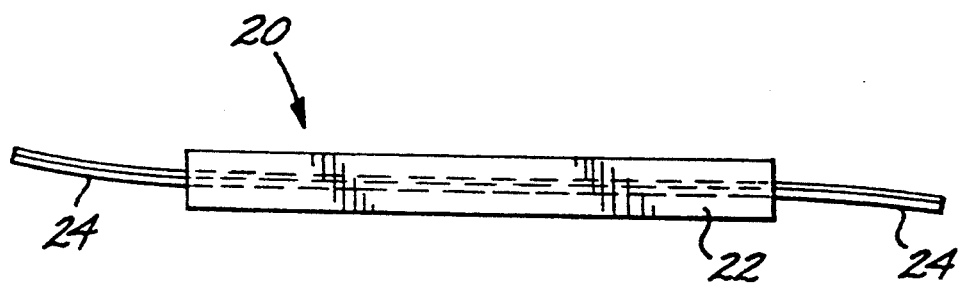
FIG. 6 is an elevational view of a piece of the thermal foil material, with the wire conductors extending from the ends of the piece.

FIG. 6 illustrates another embodiment of the invention, wherein the thermal foil material 20 is prepared with the conductor wires 24 extending from the ends of the layer of adhesive. This article is of use in making thermal connectors or thermal links in cryogenic systems. The exposed metal is readily fastened to structures at either end by soldering, brazing, mechanical connector, etc. It may be readily shaped as necessary prior to curing the adhesive layer, as discussed previously.

The present invention therefore provides an advance in the art of heat conductive materials for use in cryogenic construction. Although particular embodiments of the invention have been described in detail for purposes of illustration, various modifications may be made without departing from the spirit and scope of the invention. Accordingly, the invention is not to be limited except as by the appended claims.

What is claimed is:

1. A method of preparing a thermal foil material, comprising the steps of:

furnishing a first sheet of a B-staged film adhesive material;

placing a layer of metallic elements onto the first sheet, the metallic elements being arranged in a side-by-side fashion with interstices therebetween;

placing a second sheet of a B-staged film adhesive material over the layer of metallic elements and the first sheet, the second sheet being in direct contact with the first sheet so that the layer of metallic elements is sandwiched between the first sheet and the second sheet; and applying a pressure perpendicular to the first and second sheets to cause the B-staged film adhesive material to flow into the interstices between the metallic elements, without substantial curing of the first and second sheets of film adhesive material past the B-stage cure level.

2. The method of claim 1, wherein the film adhesive material of the first sheet is an epoxy.

3. The method of claim 1 wherein the metallic elements are wires.

4. The method of claim 1, wherein the metallic elements are arranged in a single layer.

5. The method of claim 1, wherein the metallic elements are arranged in at least two layers.

6. The method of claim 1, wherein the metallic elements are made of a material selected from the group consisting of copper, aluminum, silver, gold, and alloys thereof.

7. The method of claim 1, wherein the step of applying includes the step of heating the first sheet, the metallic elements, and the second sheet.

8. The method of claim 1, wherein the step of furnishing includes the step of wrapping the first sheet around a mandrel.

9. A method of preparing a thermal foil material, comprising the steps of:

furnishing a first sheet of a B-staged film adhesive material;

placing a layer of metallic elements onto the first sheet, the metallic elements being arranged in a side-by-side fashion with interstices therebetween;

placing a second sheet of a B-staged film adhesive material over the layer of metallic elements and the first sheet, the second sheet being in direct contact with the first sheet so that the layer of metallic elements is sandwiched between the first sheet and the second sheet;

applying a pressure perpendicular to the first and second sheets to cause the B-staged film adhesive material to flow into the interstices between the metallic elements, without substantial curing of the first and second sheets of film adhesive material past the B-stage cure level; and cooling the material to retard further curing prior to use.

* * * * *